United States Patent [19]
Shishido

[11] Patent Number: 6,137,490
[45] Date of Patent: *Oct. 24, 2000

[54] COMPUTER SYSTEM FOR OPERATING PLURAL APPLICATIONS AND DISPLAY DEVICES

[75] Inventor: Hironobu Shishido, Tokyo, Japan

[73] Assignee: Tsubasa System Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,242

[22] Filed: Dec. 10, 1996

[30] Foreign Application Priority Data

Dec. 11, 1995 [JP] Japan .................................. 7-322052

[51] Int. Cl.[7] .................................. G06F 3/00; G09G 5/10
[52] U.S. Cl. .......................... 345/343; 345/344; 345/1; 345/147
[58] Field of Search .............................. 345/20, 326, 333, 345/339, 343–346, 1, 63, 186, 6, 335, 147; 709/300, 302

[56] References Cited

U.S. PATENT DOCUMENTS

| | | | |
|---|---|---|---|
| 3,428,852 | 2/1969 | Greenblum | 315/9 |
| 4,574,364 | 3/1986 | Tabata et al. | 345/343 |
| 4,845,644 | 7/1989 | Anthias et al. | 345/343 |
| 5,038,301 | 8/1991 | Thoma, III | 345/1 |
| 5,047,754 | 9/1991 | Akatsuka et al. | 345/1 X |
| 5,075,675 | 12/1991 | Barker et al. | 345/346 X |
| 5,121,478 | 6/1992 | Rao | 345/346 |
| 5,257,096 | 10/1993 | Oshima | 348/657 |
| 5,315,695 | 5/1994 | Saito et al. | 345/63 X |
| 5,353,398 | 10/1994 | Kitahara et al. | 345/332 |
| 5,452,416 | 9/1995 | Hilton et al. | 345/346 |
| 5,585,821 | 12/1996 | Ishikura et al. | 345/1 X |

FOREIGN PATENT DOCUMENTS

| | | |
|---|---|---|
| 0 112 050 | 6/1984 | European Pat. Off. . |
| 6-83563 | 4/1992 | Japan . |
| 4-170585 | 6/1992 | Japan . |
| 6-332653 | 5/1993 | Japan . |
| WO 92/03816 | 3/1992 | WIPO . |
| WO 95/03600 | 2/1995 | WIPO . |

OTHER PUBLICATIONS

"Computer Dictionary", Microsoft PRESS, pp. 279, 1994.
News Release, "Omnicomp To Introduce New Products At NCGA'88 In Anaheim", Feb. 1, 1988.
Oliver Jones, "Introduction To The X Window System", Prentice Hall, p. 28, 34–35, 38, 39, and 62, 1989.
News Release, "Man–Machine Interface Software Runs On HP Risc Work Stations Under UNIX", Nov. 2, 1992.
Robert Cowart, "Mastering Windows 3.1", Sybex, p. 14, 1992.
Pogue, et al., "MacWorld, Mac & Power Mac Secrets" 1994, IDG Books Worldwide Inc., San Mateo, CA (US) XP002029334; p. 176, line 15–17, p. 177, line 6–10; p. 286–p. 289; figs 10.4–10.9; p. 432, line 1; p. 434, line 27; figs. 16.1, 16.2; p. 439, line 1–p. 440, line 10; fig. 16.7.

*Primary Examiner*—Raymond J. Bayerl
*Assistant Examiner*—X. L. Bautista
*Attorney, Agent, or Firm*—Jones & Askew

[57] ABSTRACT

An operator switches over an application and inputs data through a keyboard 1. Each of CRTs 2 and 3 displays the application and the data inputted by the input unit. A control unit 11 executes processing and switchover of the application, executes processing of the input data and the input key from the keyboard 1, and executes display processing on the CRTs 2 and 3.

4 Claims, 7 Drawing Sheets

FIG.6

| PROCESS1 | CRT1 |
|---|---|
| PROCESS2 | CRT2 |
| PROCESS3 | CRT1 |
| PROCESS4 | CRT2 |
| | |
| | |
| | |

FIG.7

| CRT1 | PROCESS1 | PROCESS3 | . . . |
|---|---|---|---|
| CRT2 | PROCESS4 | PROCESS2 | |

COMPUTER SYSTEM FOR OPERATING PLURAL APPLICATIONS AND DISPLAY DEVICES

BACKGROUND OF THE INVENTION

1. Field of the Invention

The present invention relates to a computer system for executing a plurality of applications on a processor while switching over the applications, and displaying a content of the execution thereof on a display device.

2. Description of the Related Art

A window system has hitherto been employed when executing a plurality of applications while being switched over on a computer system. In the window system, when simultaneously executing the plurality of applications, an image of each application to be executed is displayed in a separately independent window on a single display device. On this occasion, an active application is displayed in a foremost window, while other applications are displayed in windows superposed toward a rearmost side in the window system. Further, the input data from the keyboard are transferred to the active application, i.e., the application corresponding to the window displayed in the foremost window.

In the window system, however, if the plurality of windows are superposed, it may happen that the window in which the process should resume by making a status thereof active is hidden by other windows. Therefore, a defect is that it is time-consuming to search the window which should be made active. Further, in the case of making an inventory reference of goods while receiving an order on the telephone, it is required that an application of the inventory reference and an application of a sales input be executed simultaneously. However, processing contents of the two applications must be displayed simultaneously, and hence a considerably large-sized display device is needed. In this case, there can be also considered a method of obtaining the same effect as if a display screen appears large in size by reducing a display of characters on a normal-sized display device. However, the characters are small and therefore hard to read, resulting in deterioration in terms of working efficiency and an easy-to-occur error as well. Accordingly, as a matter of fact, there is no alternative but to arrange a plurality of computers for use, which in turn requires a great amount of costs for the hardware and a large installation space therefor.

It is an object of the present invention, which was contrived in view of such problems inherent in the prior art, to provide a computer system capable of displaying processing contents by simultaneously executing a plurality of applications without using a large-sized display device and requiring a plurality of computers.

SUMMARY OF THE INVENTION

A computer system according to the present invention comprises an input unit for inputting data or a switchover indication, a plurality of display units for displaying images, and a control unit for making one of the display units display the display data for every process by simultaneously executing processes of generating the display data for displaying the images by using the above data, and, when the above data are inputted from the input unit, transfers the relevant data to one specified process, and, when the switchover indication is inputted from the input unit, switches over a destination of the data transfer thereafter to other process.

Thus, the plurality of display units can be utilized by one input unit and the control unit, and hence it is feasible to simultaneously display the plurality of applications so as to be usable at a high efficiency and also enhance a working efficiency.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a diagram showing a process-CRT table processed in the control unit shown in FIG. 1;

FIG. 7 is a diagram showing a CRT-process table processed in the control unit shown in FIG. 1.

DESCRIPTION OF THE PREFERRED EMBODIMENT

An embodiment of the present invention will hereinafter be described with reference to FIGS. 1 through 7.

Figure 1:
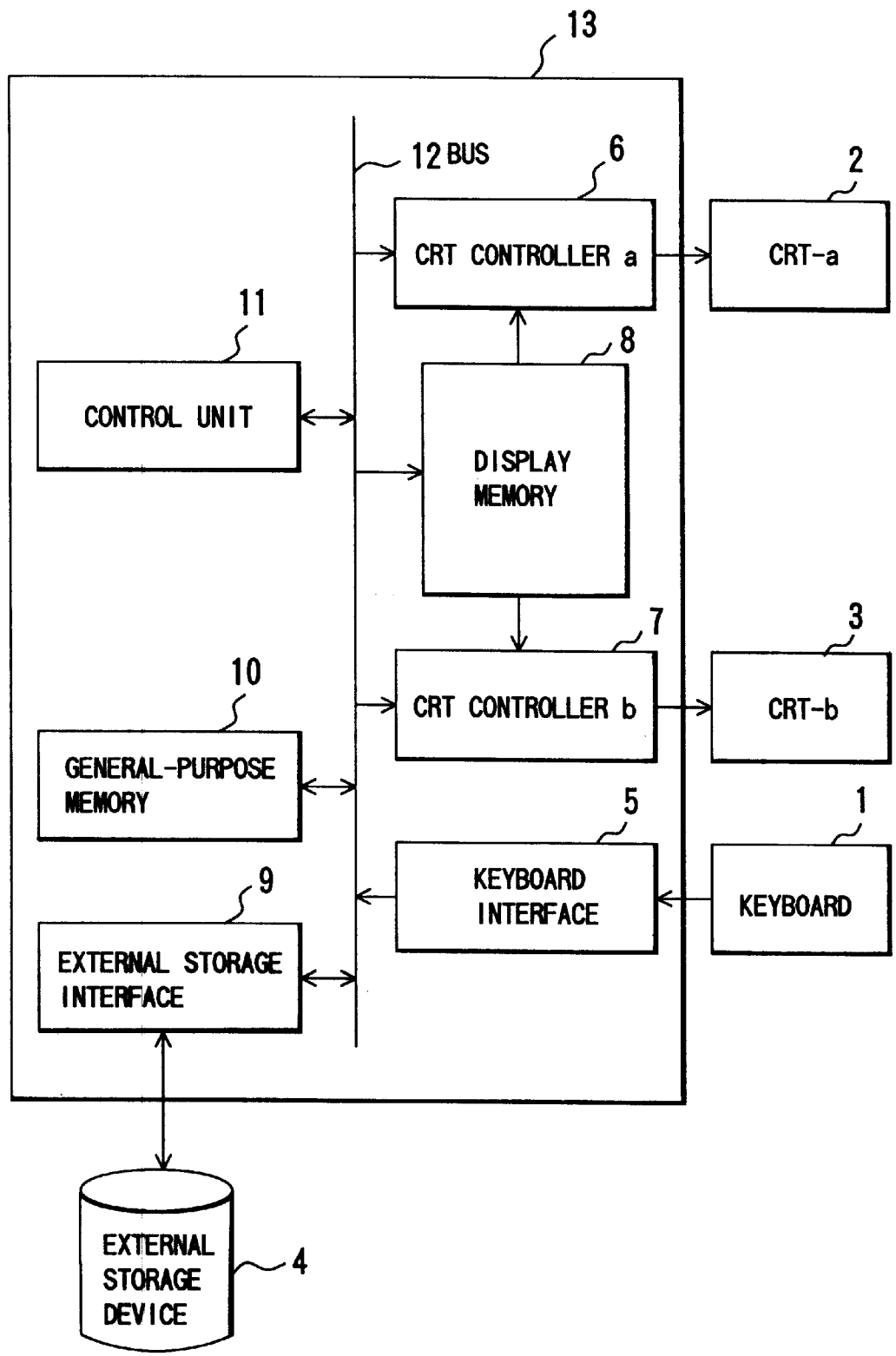
FIG. 1 is a block diagram illustrating an architecture of a computer in accordance with a first embodiment of the present invention.

FIG. 1 is a block diagram illustrating an architecture of a computer in accordance with a first embodiment. Referring to FIG. 1, this computer is constructed of a keyboard 1, a CRT (Cathode Ray Tube)-a2, a CRT-b3, an external storage device 4 and a computer body 13. Further, the computer body 13 consists of a keyboard interface 5, a CRT controller a6, a CRT controller b7, a display memory 8, an external storage interface 9, a general-purpose memory 10 and a control unit 11, which are connected to each other via a bus 12.

The keyboard 1 serving as an inputting unit is an input device by which an operator inputs characters, etc. and for switching over windows and the applications.

The CRT-a2 and CRT-b3 are display devices for displaying characters and images of a window system, window characters and window images, application characters and application images, and characters and images of data inputted via the keyboard. When the window system is started up, some or the whole of respective windows for displaying the images relative to the individual applications are displayed as if being superposed on screens of the CRTs 2 and 3. The window positioned uppermost among the thus superposed windows is termed a "foremost window". Similarly, the window positioned lowermost among the superposed windows is termed a "rearmost window". Note that the CRT-a2 and CRT-b3 may be liquid crystal displays.

The external storage device 4 is a hard disk for storing window systems (e.g., X11 developed by Massachusetts Institute of Technology, and "Windows 95 (Trade Mark)"

made by Microsoft Corp.), software such as a variety of applications, and inputted sales data. Note that the external storage device 4 may be a magneto-optic disk.

The computer body 13 is a device for executing the window system and the application, processing keys and data inputted from the keyboard 1, processing image data displayed on the CRT-a2 and CRT-b3, and executing a reading process of the software and data from the external storage device 4 and a writing process of the data to the external storage device 4.

The keyboard interface 5 is a device for transferring, to the bus, the data of the characters, etc. and signals of the keys inputted from the keyboard 1.

The display memory 8 is a memory for holding the data of the characters and images that are to be displayed on the CRT-a2 and CRT-b3.

The CRT controller a6 is a device for controlling the process of displaying, on the CRT-a2, the data held to be displayed on the CRT-a2 among pieces of data of the characters and images that are held by the display memory 8.

The CRT controller b7 is a device for controlling the process of displaying, on the CRT-b3, the data held to be displayed on the CRT-b3 among pieces of data of the characters and images that are held by the display memory 8.

The display unit is constructed of the CRT-a2, the CRT-b3, the CRT controller a6, the CRT controller b7 and the display memory 8.

The external storage interface 9 is a device for controlling the processes of reading and writing the data from and to the external storage device 4.

The control unit 11 serving as a control device is constructed of a CPU and a RAM, etc. and gives indications of luminances and screen display to the CRT controllers a6 and b7. Further, the control unit 11 receives the data of the characters and the signals of the input keys from the keyboard 1 via the keyboard interface 5.

Next, the operation of the control unit 11 will be explained. In a normal status, the control unit 11 starts up the window system as an operating system, and executes the respective applications of inventory references, sales inputs and so forth by multi-processing. Then, when there are a key input from the operator and a request for displaying on the CRT from each process, the input and request are processed by an interrupt of the software or hardware.

An image (including the character) generated by each process is displayed on one of the CRT-a2 and CRT-b3. This correspondence between each process and the CRT on which the image is displayed is managed by a process-CRT table and a CRT-process table. The CRT on which a certain process is displayed is specified by an ID number of this process with reference to an entry of the same process ID in the process-CRT table. FIG. 6 shows an example of the process-CRT table. Further, the process ID of the process that is being displayed on the CRT is obtained from one of the CRTs by referring to an entry of the same CRT in the CRT-process table. FIG. 7 shows an example of the CRT-process table. Referring to FIG. 7, the windows for displaying the processes are displayed on more front sides on the CRTs 2 and 3 as the processes are written on more left sides, and the processes written on more right sides are displayed on more rear sides. These tables are held in the general-purpose memory 10, properly referred by the control unit 11 and then updated.

Also, the control unit 11, upon the key input from the operator or the indication from each process, generates a process if requested to generate a new process. Similarly, upon the key input from the operator or the indication from each process, the control unit 11, if requested to extinguish the process, extinguishes the process concerned on the basis of this request.

Moreover, the control unit 11 controls displaying of two pieces of CRT-a2 and CRT-b3. The control unit 11 controls one of the two CRTs in an active status to enhance the luminance and controls the other in an inactive status to decrease the luminance. The operator is able to recognize which CRT is active from a difference in the luminance between the two CRTs. Further, a piece of data about which CRT is active is held by a status-of-CRT holding flag within the computer body 13. When the CRT-a2 is active, the status-of-CRT holding flag is held with "0". When the CRT-b3 is active, the status-of-CRT holding flag is held with "1". This status-of-CRT holding flag is held by the general-purpose memory 10, properly referred by the control unit 11 and also updated.

Figure 2:
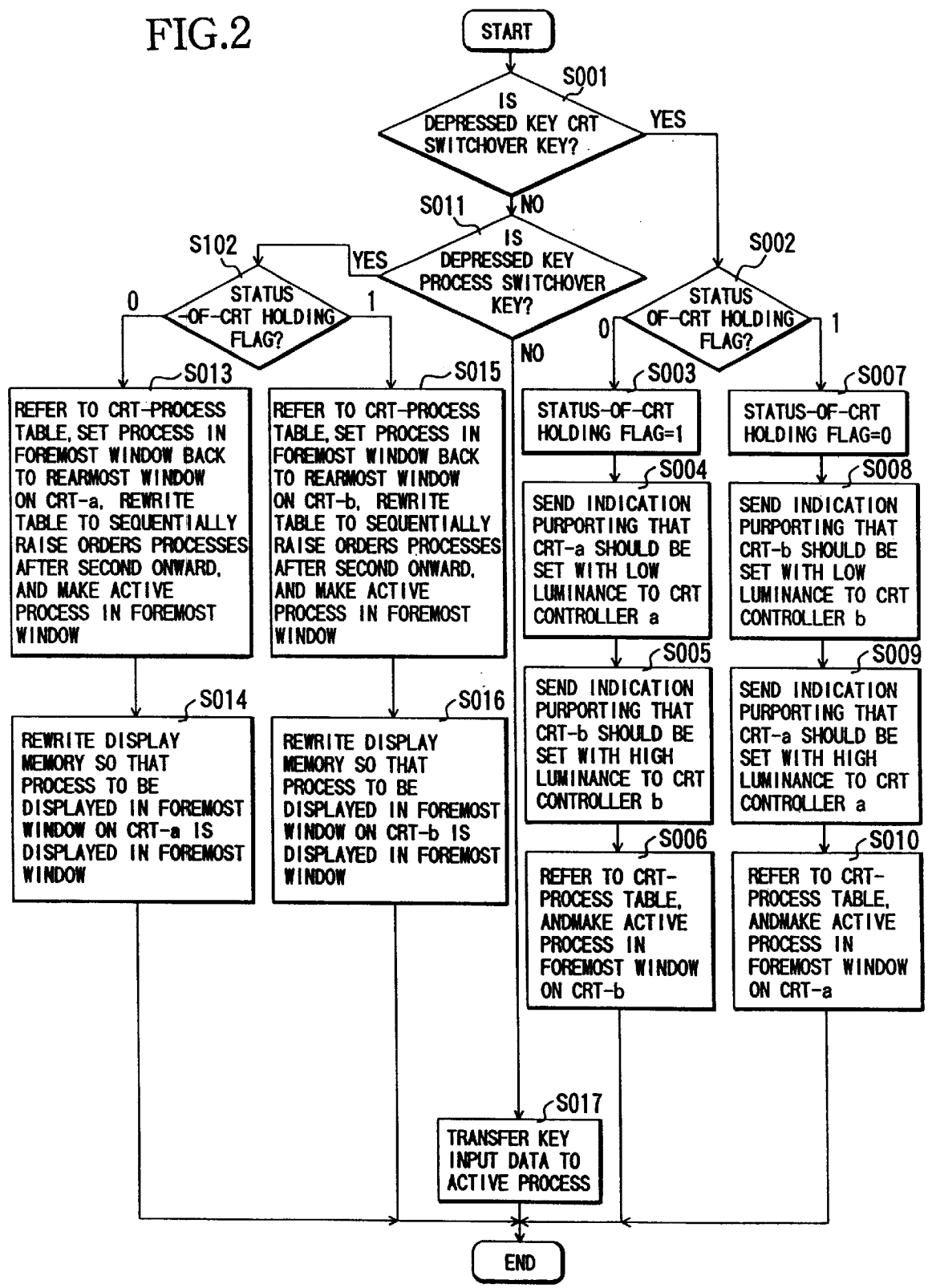
FIG. 2 is a flowchart showing a control process for inputting a key, which is executed by a control unit shown in FIG. 1.

Next, an operation of the control unit 11 for an interrupt by the key input from the keyboard 1, will be explained with reference to a flowchart of FIG. 2.

To begin with, the control unit 11 checks whether or not a content of the key input is a CRT switchover key (S001). Note that the CRT switchover key may be provided as a special key in the keyboard 1 or may be used with an allocation of a function key, etc.

If the key input is given by the CRT switchover key, the control unit 11 checks which CRT is now active, the CRT-a2 or the CRT-b3, by reading the status-of-CRT holding flag from the general-purpose memory 10 and checking this flag (S002).

If the status-of-CRT holding flag is "0", i.e., when the CRT-a2 is active, the control unit 11 changes the status-of-CRT holding flag to "1" and writes "1" to the general-purpose memory 10 (S003). Thereafter, the control unit 11 sends to the CRT controller a6 an indication purporting that the CRT-a2 should be set with a low luminance (S004). Further, the control unit 11 sends to the CRT controller b7 an indication purporting that the CRT-b3 should be set with a high luminance (S005). Then, the control unit 11 reads the CRT-process table from the general-purpose memory 10, refers to a process name corresponding to the CRT-b3, and makes active the process the image of which is displayed in the foremost window on the CRT-b3 (S006).

Also, when the status-of-CRT holding flag is "1", i.e., when the CRT-b3 is active, the control unit 11 changes the status-of-CRT holding flag to "0" and writes it to the general-purpose memory 10 (S007). Thereafter, the control unit 11 sends to the CRT controller b7 an indication purporting that the CRT-b3 should be set with a low luminance (S008). Furthermore, the control unit 11 sends to the CRT-a2 should be set with a high luminance (S009). Then, the control unit 11 reads the CRT-process table from the general-purpose memory 10, refers to a process name corresponding to the CRT-a2, and makes active the process the image of which is displayed in the foremost window on the CRT-a2 (S010).

If the inputted key is not the CRT switchover key in S001, the control unit 11 next checks whether or not the inputted key is the process switchover key (S011). Note that the process switchover key may be provided as a special key in the keyboard 1 or may be used with an allocation of a function key, etc. Then, if the inputted key is the process switchover key, the control unit 11 checks which CRT is now active, the CRT-a2 or the CRT-b3, by reading the status-of-CRT holding flag from the general-purpose memory 10 and checking this flag (S012). If the status-of-CRT holding flag is "0", i.e., when the CRT-a2 is active, the control unit 11 reads the CRT-process table from the general-purpose memory 10 and refers to a process name corresponding to the CRT-a2. Subsequently, the control unit 11 sets a display position of the relevant image of the process the image of which is displayed in the foremost window on the CRT-a2, back to the rearmost window. The control unit 11, at the same time, changes the CRT-process table and writes it to the general-purpose memory 10 so as to set forward one by one the display position of the relevant image of the process that is displayed after the second onward, sequentially toward the foremost window. Moreover, the control unit 11 makes active the process set forward so that the image thereof is displayed in the foremost window (S013). Subsequently, the control unit 11 rewrites the display memory 8 to display, in the foremost window on the screen of the CRT-a2, the image (including the character) of the process set forward to be displayed in the foremost window and made active (S014).

When the status-of-CRT holding flag is "1", i.e., when the CRT-b3 is active, the control unit 11 reads the CRT-process table from the general-purpose memory 10 and refers to the process name corresponding to the CRT-b3. Then, the control unit 11 sets the process the image of which is displayed in the foremost window on the CRT-b3, back to the rearmost window, and changes the CRT-process table and writes it to the general-purpose memory 10 so as to set forward one by one the display position of the relevant image of the process that is displayed after the second onward, sequentially toward the foremost window. Moreover, the control unit 11 makes active the process set forward so that the image thereof is displayed in the foremost window (S015). Then, the control unit 11 rewrites the display memory 8 to display, in the foremost window on the screen of the CRT-b3, the image (including the character) of the process set forward to be displayed in the foremost window and made active (S016).

If the inputted key is neither the CRT switchover key nor the process switchover key, the control unit 11 transfers the key input data directly to the active process (S017).

Figure 3:
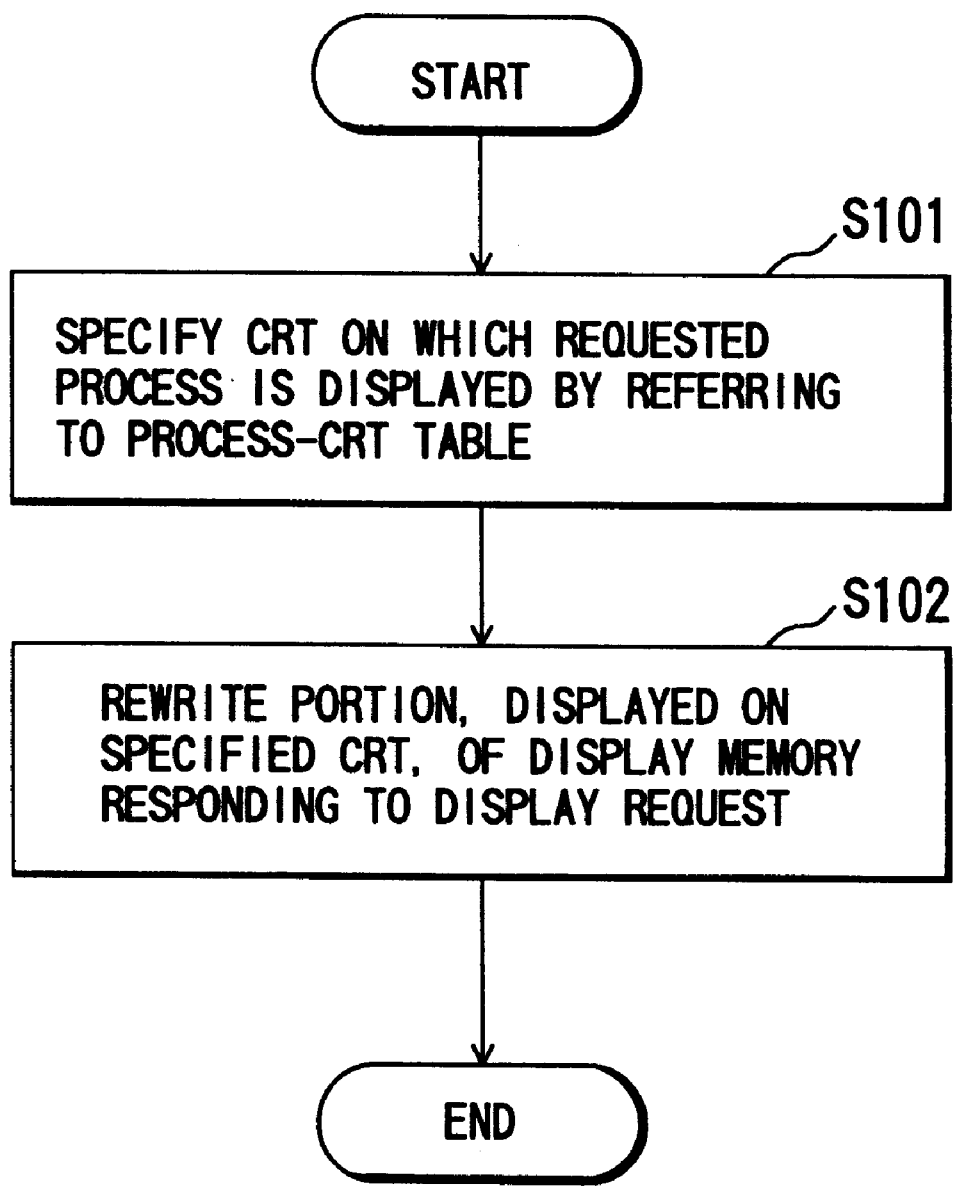
FIG. 3 is a flowchart showing a display process executed by the control unit shown in FIG. 1.

Next, the interrupt process of the control unit 11 when each process makes a display request on the CRT, will be discussed with reference to a flowchart of FIG. 3.

When the display request is given from the process, the control unit 11 reads the process-CRT table from the general-purpose memory 10 and refers thereto, and thereby specifies which CRT displays the process that has made the request, the CRT-a2 or the CRT-b3 (S101). Then, a part, displayed on the specified CRT, of the image data in the display memory 8 is rewritten in accordance with a content of the display request (S102).

Figure 4:
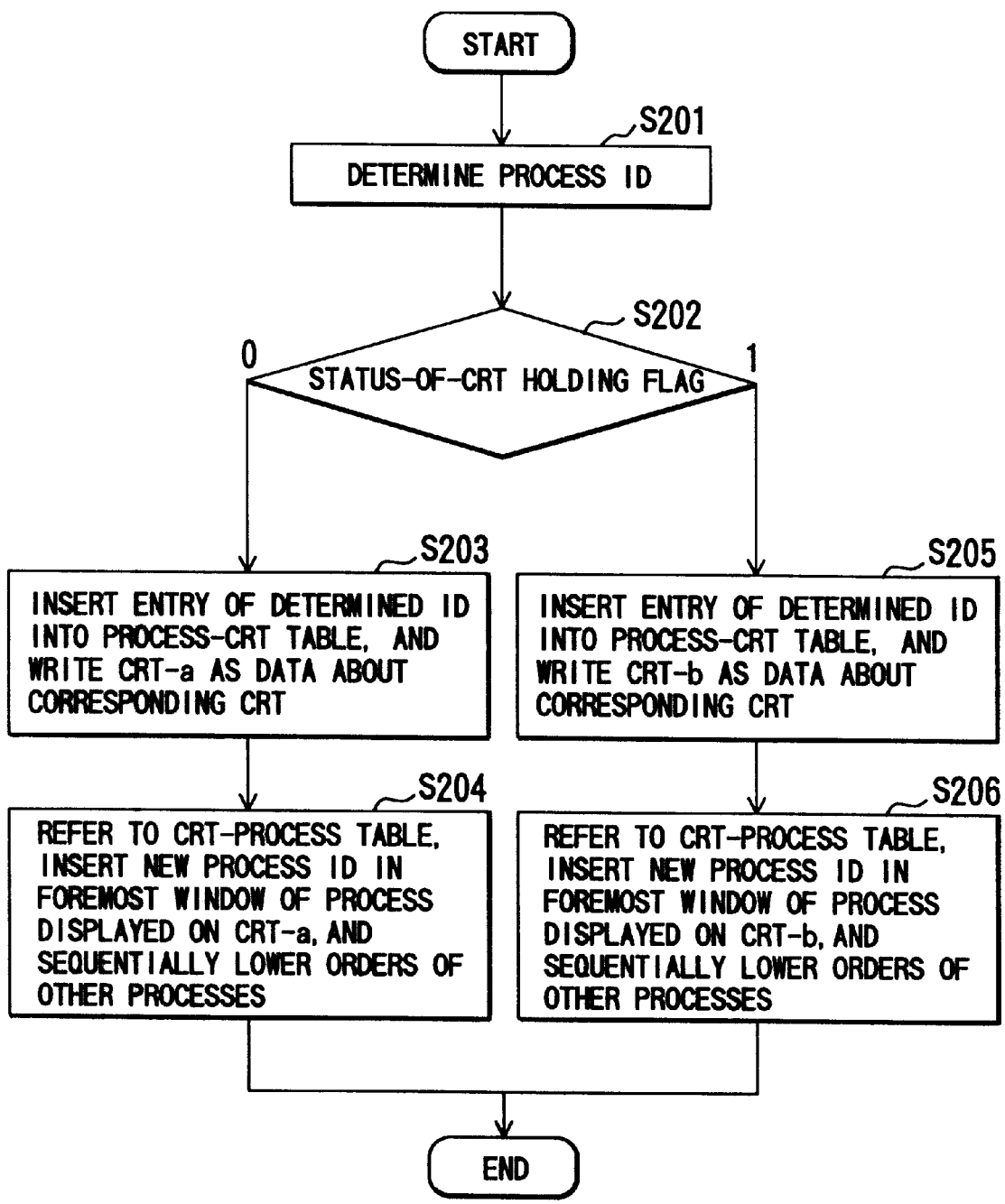
FIG. 4 is a flowchart showing a process generation executing by the control unit shown in FIG. 1.

Next, a process by the control unit 11 when generating the process will be explained with reference to a flowchart of FIG. 4.

When requested for generating the process, the control unit 11 at first determines the process ID (S201). Next, the status-of-CRT holding flag is read from the general-purpose memory 10 and then checked (S202). When the status-of-CRT holding flag is "0", i.e., when the CRT-a2 is active, the control unit 11 reads the process-CRT table from the general-purpose memory 10, inserts an entry with data about the CRT-a2 corresponding to the process ID determined in S201, and writes it back to the general-purpose memory 10 (S203). Further, the control unit 11 reads the CRT-process table from the general-purpose memory 10, inserts the process ID determined in S201 into the entry of the highest-order (on the most left side in FIG. 7) of the CRT-a2, and at the same time writes it back to the general-purpose memory 10 while sequentially lowering orders of entries of other processes (S204).

When the status-of-CRT holding flag "1", i.e., when the CRT-b3 is active, the control unit 11 reads the process-CRT table from the general-purpose memory 10, inserts an entry with data about the CRT-b3 corresponding to the process ID determined in S201, and writes it back to the general-purpose memory 10 (S205). Further, the control unit 11 reads the CRT-process table from the general-purpose memory 10, inserts the process ID determined in S201 into the entry of the highest-order of the CRT-b3, and at the same time writes it back to the general-purpose memory 10 while sequentially lowering orders of entries of other processes (S206).

Figure 5:
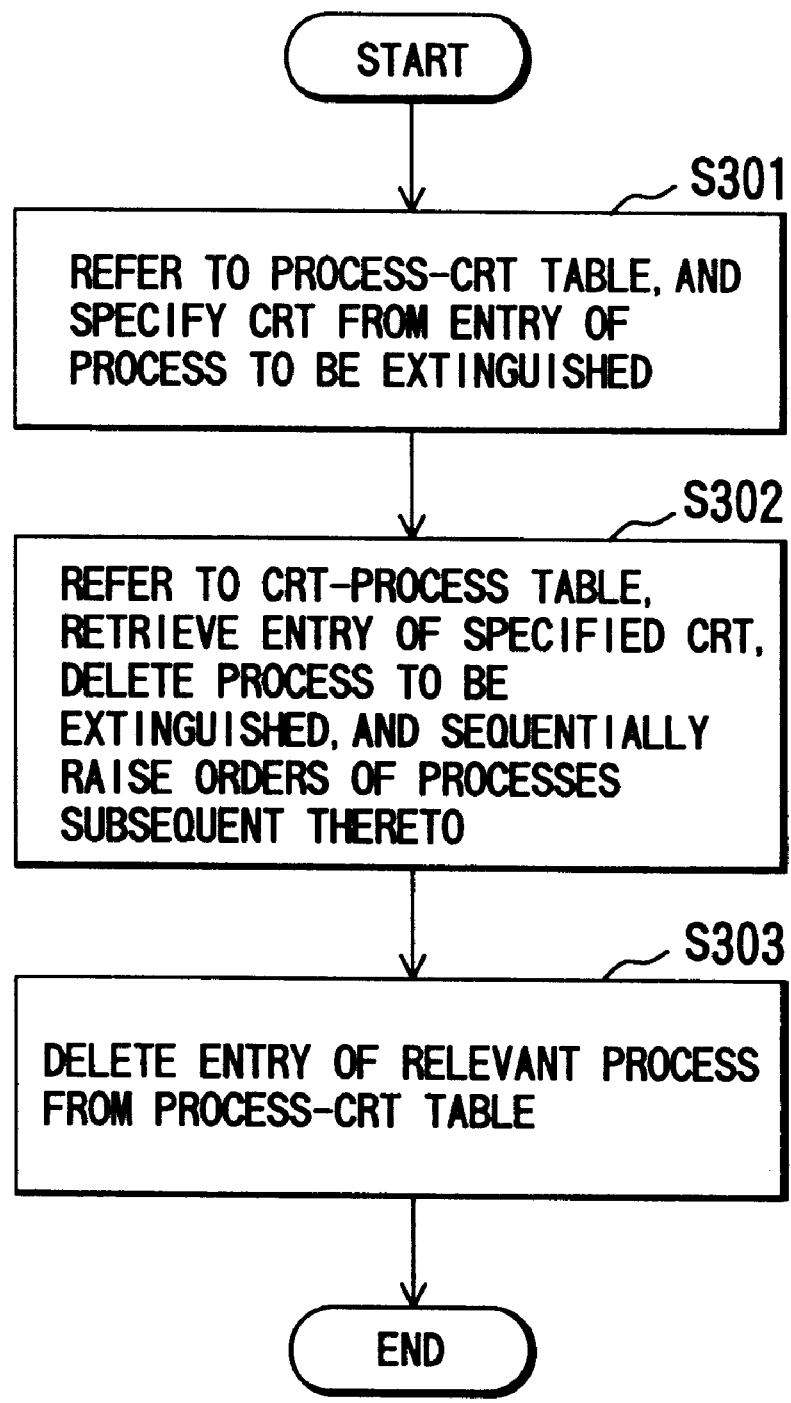
FIG. 5 is a flowchart showing a process extinction executed by the control unit shown in FIG. 1.

Next, a process by the control unit 11 when extinguishing the process will be explained with reference to a flowchart of FIG. 5.

When requested for extinguishing the process, the control unit 11 reads the process-CRT table from the general-purpose memory 10 and specifies the CRT on which the relevant process is displayed based on the entry of the process to be extinguished (S301). Next, the control unit 11 reads the CRT-process table from the general-purpose memory 10, retrieves the entry of the specified CRT, deletes the process ID of the process to be extinguished, and writes it back to the general-purpose memory 10 while sequentially raising orders of the processes subsequent thereto (S302). Then, the control unit 11 deletes an entry of the process to be extinguished from the process-CRT table and write it back to the general-purpose memory 10 (S303).

Figure 8:
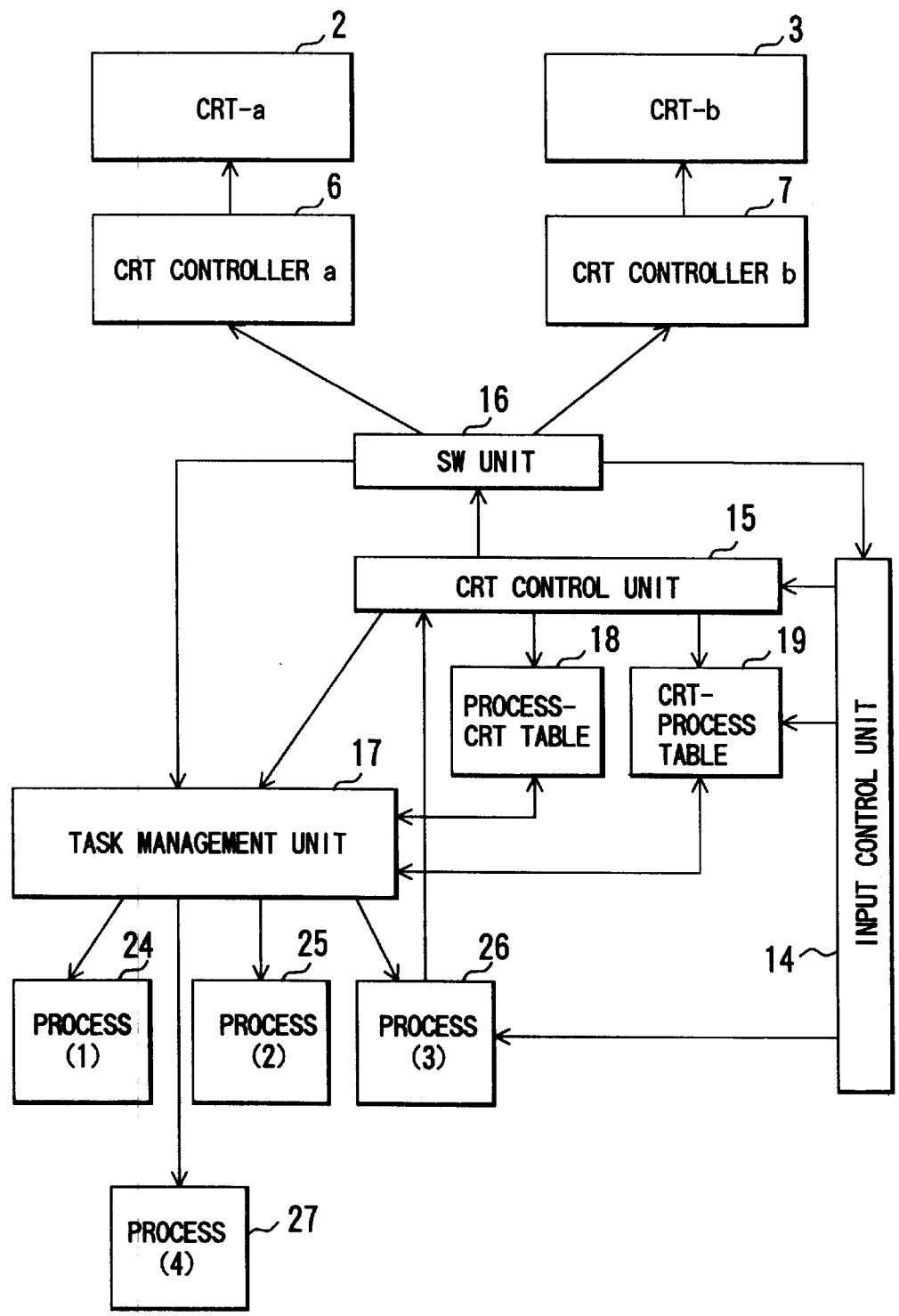
FIG. 8 is a conceptual diagram illustrating the first embodiment of the present invention.

FIG. 8 is a conceptual diagram in which the first embodiment discussed above is expressed by blocks each provided per function. Referring to FIG. 8, this computer is constructed of an input control unit 14, a CRT control unit 15, an SW unit 16, a task management unit 17, a process-CRT table 18, a CRT-process table 19, a CRT-a2, a CRT-b3, a CRT controller a6, a CRT controller b7, a process (1)24, a process (2)25, a process (3)26 and a process (4)27.

Next, each function block shown in FIG. 8 will be explained.

The process-CRT table 18 performs the same function as that of the process-CRT table shown in FIG. 6.

The CRT-process table 19 also performs the same function as that of the CRT-process table shown in FIG. 7.

The CRT-a2 performs the same function as that of the CRT-a2 shown in FIG. 1.

The CRT-b3 performs the same function as that of the CRT-b3 shown in FIG. 1.

The CRT controller a6 performs the same function as that of the CRT controller 6 shown in FIG. 1.

The CRT controller b7 also performs the same function as that of the CRT controller 7 shown in FIG. 1.

The SW unit 16 performs a function of executing a process in response to a display request received from the CRT control unit 15, a function of switching over the active CRT based on an indication received from the CRT control unit 15, and a function of holding a status of active CRT, the CRT-a2 or the CRT, and properly providing the data thereof. These functions correspond to the functions performed by the control unit 11, the display memory 8 and the status-of-CRT holding flag stored in the general-purpose memory 10 in FIG. 1.

Next, the operation of the SW unit 16 will be described. The SW unit 16, upon receiving the display request from the CRT control unit 15, sends an indication purporting that displaying should be given on the relevant CRT, to one of the CRT controller a6 and the CRT controller b7 in response to that request.

Further, the SW unit 16, upon receiving an indication purporting that the active CRT is switched over from the CRT control unit 15, sends an indication purporting that the relevant CRT should be set with a high luminance to the CRT controller a6 or the CRT controller b7 for controlling the CRT-a2 or the CRT-b3 that newly becomes active. Simultaneously, the SW unit 16 sends an indication purporting that the relevant CRT should be set with a low luminance, to the CRT controller a6 or b7 for controlling the other CRT.

Moreover, the SW unit 16 holds the data showing which CRT is active and properly provide the data about the active CRT in response to requests from the task management unit 17 and the input control unit 14.

The task management unit 17 performs a function of generating and extinguishing the process, and a function of properly making the respective processes 24 through 27 active or inactive. These functions correspond to the functions performed by the control unit 11 illustrated in FIG. 1.

Next, the operation of the task management unit 17 will be explained.

In the case of generating the process, the task management unit 17 inserts and writes an entry of the process to be generated to the process-CRT table 18, from a process ID of the process to be generated and an ID of the CRT that is now active, which is obtained from the data given from the SW unit 16. At the same time, the task management unit 17 inserts and writes a newly generated process ID to the entry of the now-active CRT.

Further, the task management unit 17, when extinguishing the process, deletes the entry of the process to be extinguished from the process-CRT table 18. Simultaneously, the task management unit 17 deletes a process ID to be extinguished from the entry of the relevant CRT, of the CRT-process table 19.

The input control unit 14 controls a function of processing the key input from the operator, which function corresponds to the function performed by the key board 1, the keyboard interface 5 and the control unit 11 in FIG. 1.

Next, the operation of the input control unit 14 will be described.

When the key input is given, the input control unit 14 checks a content of this key input, and, if determined to be a CRT switchover key or a process switchover key, sends this content to the CRT control unit 15. If determined to be a key input other than the above-mentioned, the input control unit 14 obtains an ID of the now-active CRT from the SW unit 16, refers to an entry of the relevant CRT, of the CRT-process table 19, specifies the process ID of a now-active process, and sends a content of the key input of this process.

The CRT control unit 15 controls a function of processing the display request received from each process and sending it to the SW unit 16, and a function of processing a content of the CRT switchover key that is received from the input control unit 14 and sending it to the SW unit 16. These functions correspond to the functions performed by the control unit 11 shown in FIG. 11.

Next, the operation of the CRT control unit 15 will be described.

Upon receiving the display request from each process, the CRT control unit 15 refers to the process-CRT table 18, specifies the CRT on which the process is being displayed, and sends an indication consisting of the content of the display request and the CRT's ID to the SW unit 16.

Further, the CRT control unit 15, when receiving the CRT switchover key from the input control unit 14, specifies which CRT is now active by receiving a supply of the data from the SW unit 16. Then, the CRT control unit 15 sends an indication to the SW unit 16 so that this active CRT is made inactive and is set to have a low luminance, while the other inactive CRT is made active and is set to have a high luminance. Simultaneously, the CRT control unit 15 specifies the process ID in the foremost window from the entry of the CRT that has newly become active by referring to the CRT-process table 19, and sends a indication to the task management unit 17 so that the relevant process is made active.

Further, the CRT control unit 15, upon receiving the process switchover key from the input control unit 14, specifies which CRT is now active by receiving the supply of the data from the SW unit 16, and refers to the entry of the relevant CRT, of the CRT-process table 19. Then, the CRT control unit 15 sets the process displayed in the foremost window of the relevant CRT back to the rearmost window, and also updates and writes the CRT-process table 19 so as to sequentially raise the orders of the processes after the second onward. At the same time, the CRT control unit 15 sends an indication to the task management unit 17 to make active the process that has been newly determined to be displayed in the foremost window of the relevant CRT.

Thus, the operator is able to making use of the two CRTs, i.e., the CRT-a2 and the CRT-b3 through one keyboard 1 and the computer body 13.

As discussed above, according to the present invention, it is possible to use simultaneously efficiently the plurality of windows and applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A computer system having an operating system that runs a plurality of computing processes, each of the processes having a display order, and comprising:

inputting means for allowing operator input of data or a display switchover indication to the operating system;

a display memory for storing display data associated with each of the plurality of processes;

a plurality of display devices responsive to the operating system for displaying images, a first one of the plurality of display devices being operative for displaying information from a selected one of the plurality of processes in a foremost window, wherein the first one of the plurality of display devices is operated at a predetermined luminance level indicative of an active process;

a plurality of display controllers each associated with one of the plurality of display devices and operative for causing display of display data from the display memory on an associated display device; and control means associated with the operating system and responsive to the display switchover indication from the inputting means for changing the first one of the plurality of display devices to a second one of the plurality of display devices, for changing the luminance of display of the first one of the display devices to a predetermined luminance level indicative of an inactive process, for changing the luminance of display of the second one of the display devices to a predetermined luminance level indicative of an active process, for making active the process in the foremost window of the second one of the display devices, and for directing data subsequently from the inputting means to the active process.

2. A computer system according to claim 1, wherein said control means includes a table for associating the plurality of processes with the plurality of display devices.

3. A computer system having an operating system that runs a plurality of computing processes, each of the processes having a display order, and comprising:

inputting means for allowing operator input of data or a process switchover indication or a display switchover indication to the operating system;

a display memory for storing display data associated with each of the plurality of processes;

a plurality of display devices responsive to the operating system for displaying images, a first one of the display devices being operative for displaying information from a selected one of the plurality of processes in a foremost window, wherein the first one of the display devices is operated at a predetermined luminance level indicative of an active process;

a plurality of display controllers each associated with one of the plurality of display devices and operative for causing display of display data from the display memory on an associated display device; and control means associated with the operating system and responsive to the process switchover indication from the inputting means for changing the selected one of the plurality of processes from the foremost window to a rearmost window on the first one of the display devices, for sequentially raising the orders of the plurality of processes for display after second onward, for making active the process in the foremost window, for rewriting the display memory so that information from the active process is displayed in the foremost window, and for directing data from the inputting means subsequently to the active process;

said control means being responsive to the display switchover indication from the inputting means for changing the first one of the plurality of display devices to a second one of the plurality of display devices, for changing the luminance of display of the first one of the display devices to a predetermined luminance level indicative of an inactive process, for changing the luminance of display of the second one of the display devices to a predetermined luminance level indicative of an active process, for making active the process in the foremost window of the second one of the display devices, and for directing data subsequently from the inputting means to the active process.

4. A computer system according to claim 3, wherein said control means includes a table for associating the plurality of processes with the plurality of display devices.

* * * * *